United States Patent [19]
Matsumoto et al.

[11] 3,886,567
[45] May 27, 1975

[54] OPTICAL SYSTEM POSITION CONTROLLING DEVICE

[75] Inventors: Seichi Matsumoto, Yokohama; Kazuya Hosoe, Tokyo; Akio Sunouchi, Kawasaki, all of Japan

[73] Assignee: Canon Kabushiki Kaisha, Tokyo, Japan

[22] Filed: Aug. 20, 1973

[21] Appl. No.: 389,507

[30] Foreign Application Priority Data
Aug. 28, 1972 Japan.............................. 47-86063
Nov. 15, 1972 Japan.............................. 47-114571

[52] U.S. Cl.................................. 354/25; 354/197
[51] Int. Cl. ............................................ G03b 3/10
[58] Field of Search ............. 250/204; 354/25, 197; 95/44 C, 44 R

[56] References Cited
UNITED STATES PATENTS
3,798,660   3/1974   Hasegawa et al..................... 354/25
3,827,064   7/1974   Kiyohara............................ 354/25

*Primary Examiner*—Samuel S. Matthews
*Assistant Examiner*—E. M. O'Connor
*Attorney, Agent, or Firm*—William R. Woodward

[57] ABSTRACT

The present invention relates to an optical system position controlling device applicable to camera or other optical instruments which require focusing. The subject device includes a position detecting means having a light receiving portion or surface provided with a photosensitive element which generates an electrical signal in correspondence with the brightness of an object to be photographed. The light receiving surface is moved along the optical axis of an image forming optical system to detect the position of an image formed by the image forming optical system, and when the image is not formed at a predetermined position, a portion or all of the image forming optical system is so controlled to form the image at the predetermined position.

34 Claims, 6 Drawing Figures

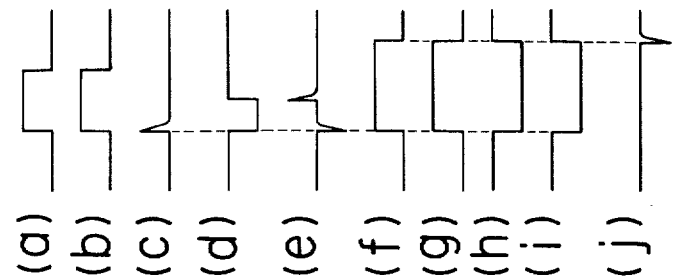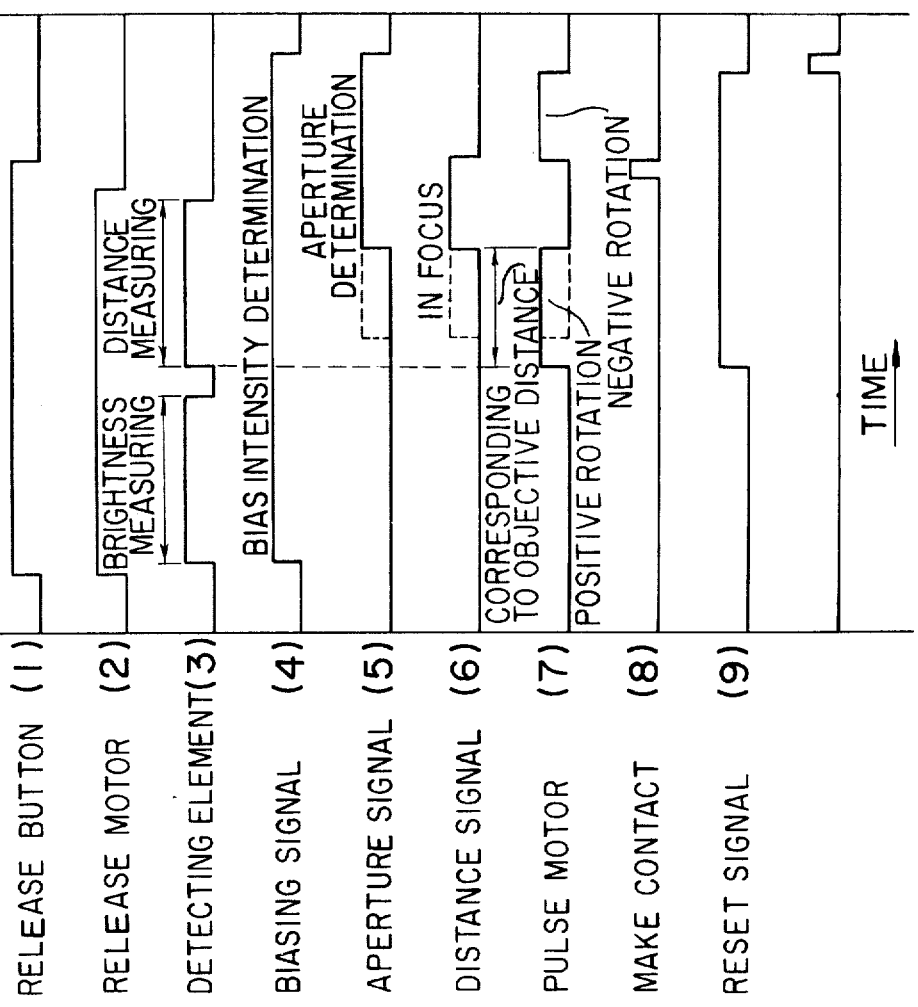

OPTICAL SYSTEM POSITION CONTROLLING DEVICE

BACKGROUND OF THE INVENTION

1. Field of the Invention

This invention relates to an optical system position controlling device applicable to cameras or other optical instruments which require focussing.

2. Description of the Prior Art

Such a focus detecting device has been disclosed in Japanese Patent Application Publication No. 16224/66 previously proposed by the instant applicant. That detecting device employs a photoconductive element or a photoelectromotive force element as a focus detecting element and has its construction adapted to detect focus, by making use of the phenomenon that when an object is focussed at a focus detecting element surface (that is to say, at in-focus condition), an output of the focus detecting element indicates an extreme value. In this case, an operating point of a comparing circuit controlling a focussing lens system is set to the extreme value of the focus detecting element in object brightness, and therefore when the brightness of an object is low and a signal level of the extreme value thereof is less than the value determined, the comparing circuit becomes inoperative, thus causing focus detection to be impossible.

SUMMARY OF THE INVENTION

An object of this invention is to stabilize the output signal level of focus detecting means by irradiating at or bias intensity according to the brightness of an object, in advance to focus detecting means.

Another object of this invention is to eliminate phenomena such as unstable action peculiar to a closed loop servo system in the vicinity of an equilibrium point by employing a pulse motor as a driving source for optical system position controlling means so as to provide a control system of an open loop construction.

Still another object of this invention is to simplify the entire control system by employing a pulse motor as a driving source for optical system position controlling means so as to provide a control system of an open loop configuration.

BRIEF DESCRIPTION OF THE DRAWINGS

FIG. 3 is an explanatory timing diagram showing operations in various parts of the block diagram of FIG. 1;

FIG. 6 is a timing diagram showing operations in parts of FIG. 5.

DESCRIPTION OF THE PREFERRED EMBODIMENT

In order to essentially simplify camera operation, the invention is so devised that at the same time when a shutter release button is depressed, the photometry of object brightness begins, after which the position of the object is measured during depression of said shutter release button, and then a shutter mechanism is actuated at the moment when the shutter is actually released, and finally the optical system controlling means is reset in preparation for subsequent photographing.

Figure 1:
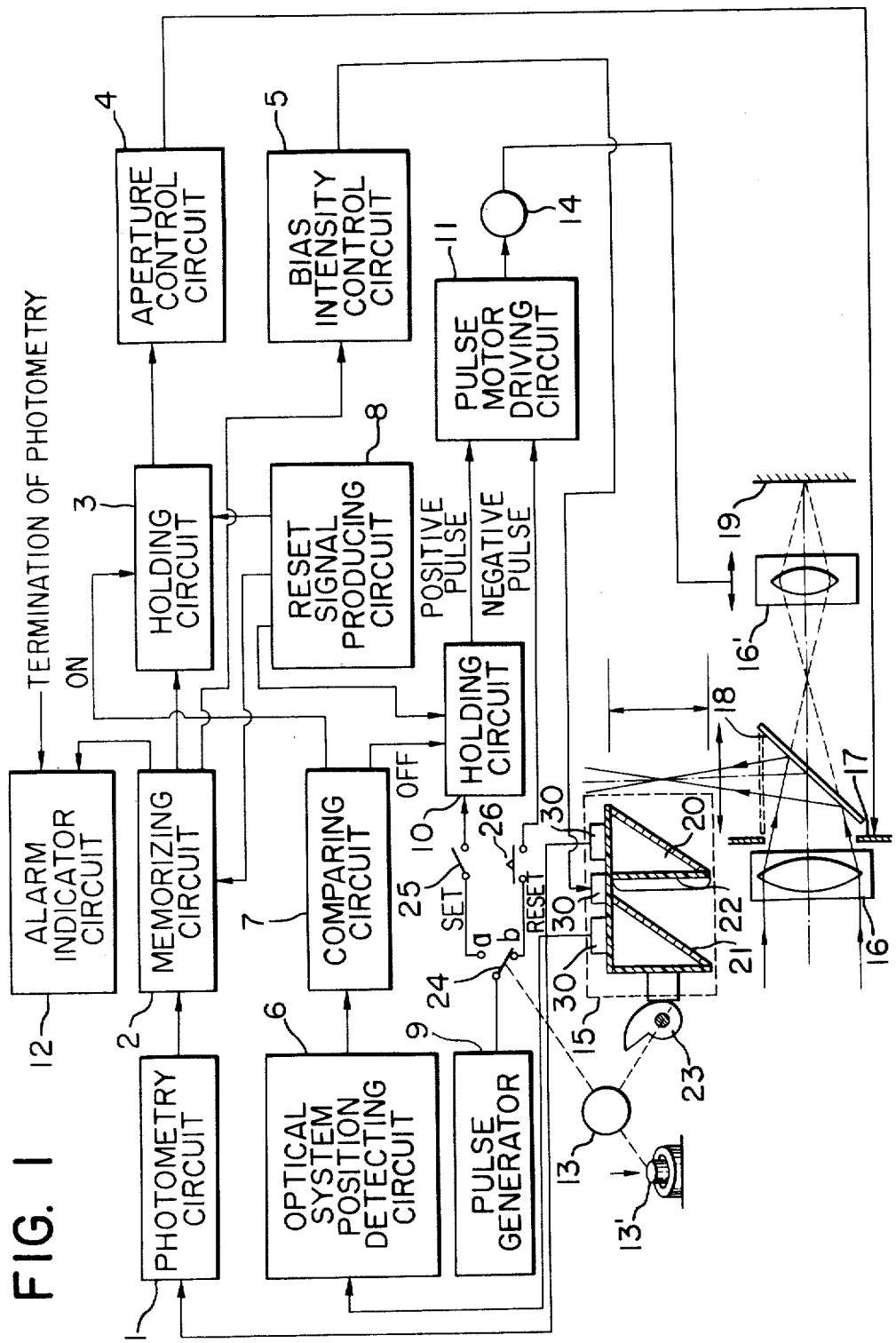
FIG. 1 is a block diagram of a device according to the invention.

Referring now to FIG. 1, a photometry circuit for measurement of object brightness is indicated by reference character 1, a memorizing circuit by 2, a holding circuit by 3, an aperture control circuit by 4, all for making proper exposure of a photographing film. A bias intensity control circuit is shown at 5. Further, an optical system position detecting circuit is indicated by reference character 6, a comparing circuit by 7 having a reference signal obtained in an image formation space scanned by the hereinafter described group of photoelectric elements for measuring an optical system position, a pulse generator by 9, a holding circuit by 10 similar to those of circuit 3, a pulse motor driving circuit by 11, and a reset signal producing circuit by 8. An alarm indicating circuit is designated by reference character 12, indicating that the optical system position can not be detected, a release motor by 13 in an interlocking relationship with a shutter release 13', and a pulse motor by 14 for driving a relay lens system 16'. The reference character 15 denotes a detecting section comprising a photoelectric converting element 20 for measuring an object brightness, a photoelectric converting element 21 for measuring an optical position, and a light source for imparting a suitable bias intensity thereto, for example, a group of luminescent diodes 22. The reference character 23 denotes a cam unit for driving the detecting section 15, the cam unit 23 being interlocked with the shutter release 13' and release motor 13.

The detecting section 15 is here scanned in an image formation space in directions indicated by a double-pointed arrow, by means of the aforesaid cam unit. A fixed photographing lens system is indicated by reference character 16, an aperture unit by 17 adapted to impart a proper exposure to a film surface 19, and a 90° reflecting mirror by 18. The reference character 24 denotes a switch in interlocking relationship with the shutter release 13', and when the shutter release is depressed, a contact arm is switched to side $a$, whereas when it is released, the contact is switched to side $b$, The switch 25 is actuated at the same time that the group of photoelectric converting elements for measuring an optical position begins to scan the image formation space, and stop switch 26 operates when the optical system position controlling means (relay lens system 16') is reset.

Furthermore, at the same time that the group of photoelectric converting elements for measuring an optical position scans through the image formation space as shown, the detecting section 15 is reset to its original state for the next operation in controlling the optical system position.

The operation of various devices shown in the block diagram will now be described.

Light beams from an object to be photographed located at a certain distance from the camera pass through the photographing lens system 16 and are reflected at the reflecting mirror 18 to form an image at a some place in the image formation space. The image forming position in the optical path and the illuminance distribution before and behind thereof are such that the illuminance in the focal surface is highest, while the illuminance before and behind the focal surface is sufficiently lower than that of the focal surface for detection. Accordingly, the distance of the object is represented by the image forming position within the image formation space where the aforesaid contrast is conspicuously present.

First, when the shutter release 13' is depressed, the release motor 13 is driven and the cam unit 23 is simultaneously driven to cause the detecting section 15 to begin scanning the image formation space from a near position toward the indefinite position. At this time, the switch 24 is also switched to the contact of side a by being interlocked with the shutter release 13'. In the detecting section 15, the illuminance in the focal surface suitably positioned within the image formation space is first measured by a group of photoelectric converting elements 20, and a photoelectric converting output in proportion to the illuminance passes the photometry circuit 1 and is memorized in the memorizing circuit 2. At the same time this output enters the bias intensity control circuit to irradiate a group of elements 21 for measuring an optical position with a suitable bias intensity. Next, at the same time that the group of elements 21 for measuring an optical position begin scanning, the switch 25 is closed to feed a positive pulse to the pulse motor driving circuit 11 passing through the holding circuit 10 thereby driving the pulse motor 14. Then, in the process of scanning by the elements 21 from a near position toward the indefinite position, an extreme value of the illuminance in a suitable position in the image formation space (which is a position same as the position where the illuminance is previously detected by the group of elements for measuring an object brightness) is obtained, and a position signal photoelectrically converted by a position detecting circuit is shaped by a comparing circuit 7 into a pulse signal which causes the holding circuit 10 to be maintained in OFF condition. Therefore, a driving pulse to the pulse motor driving circuit 11 is impeded so that the pulse motor is stopped thereby controlling a suitable optical system position. Further, when the holding circuit 3 is set to ON by the pulse in the comparing circuit 7, the illuminance signal from the photometry circuit memorized in the memorizing circuit 2 passes the aperture control circuit 4 to suitably drive the aperture unit 17 thereby imparting a proper exposure to the film surface. When the shutter button 13' is further depressed, a shutter mechanism (not shown in the drawings) is driven to momentarily flip up the reflecting mirror 18 to the position indicated by the dotted line and an image of the object suitably focussed is then projected on the film surface. The operation of the shutter release 13' is now completed and the contact arm of the switch 24 is returned to side b to feed a negative pulse to the pulse motor driving circuit. Then, when the pulse motor is thereby reversely driven to heat its original position and reaches a given point, a stop switch is actuated and a signal in the reset signal producing circuit 8 in an interlocking relationship therewith releases the memorizing circuit 2 and the holding functions of the holding circuits 3 and 10, which are then reset in the state for starting the next photographing operation.

If the brightness of the image of object is below a certain brightness, the photometric operation becomes impossible and the determination of optical system position also becomes impossible, and therefore at this time an alarm indication is effected by a signal from the photometry completion switch that is provided in an interlocking relationship with the shutter button. The relay lens system 16', as shown in the drawing, is moved on the optical axis to control the optical system position, but such a control may also be performed by moving conversely the film surface 19 conversely.

Figure 2:
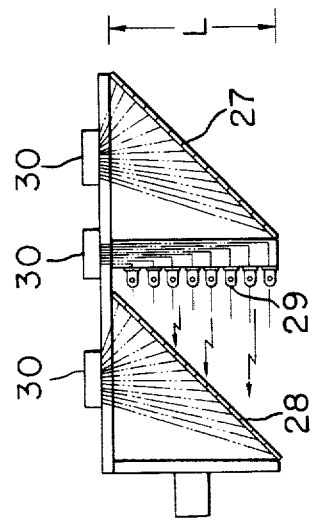
FIG. 2 is a construction view of one embodiment of a photoelectric detecting device for use in the device of FIG. 1.

FIG. 2 illustrates in detail one embodiment of the detecting section 15 of FIG. 1 in the form of a detailed construction thereof. The reference character 27 denotes an array-like photoelectric converting element having a suitable angle to an optical axis, and 28 denotes an array-like photoelectric converting element of identical construction for measuring an optical position. A plurality of luminescent diodes are indicated by reference character 29 which are adapted to illuminate the array-like element 28. The reference character 30 denotes terminals for these elements. If the length L shown in FIG. 2 is made equal to the stroke of the relay lens system 16' controlled from a "near" position to an "infinity" position, the array-like elements 27 and 28 positively detect the optical system position within the range of the length L. To enable the optical system position to be measured more accurately, unitary bodies of the array-like elements 27 and 28 may be miniatured as small as possible to their size and the number of elements may be increased. However, since the illuminance of the focal surface is required to be detected effectively, it is required that the unitary bodies of array-like elements must have their minimum size sufficiently large to avoid impairment of their detecting ability.

FIG. 3 is a timing diagram showing operations of parts of FIG. 1, which will now be described in conjunction with FIG. 1.

In FIG. 3, the reference character (1) denotes an output of the shutter release 13', (2) an output of the scanning motor 13, (3) outputs of the photoelectric converting elements 27 and 28, (4) outputs of the liminescent diodes, (5) an output of the aperture control circuit 4 determined by an ON signal from the comparing circuit 7, (6) an output of a distance signal determined by an OFF signal from the comparing circuit 7, (7) an output of the pulse motor 14 showing the distance, (8) a shutter output, (9) an output of the make contact 26, and (10) an output from the reset signal source. Further, in FIG. 3, the operation at a relatively near object position is represented by the dotted lines.

Figure 4:
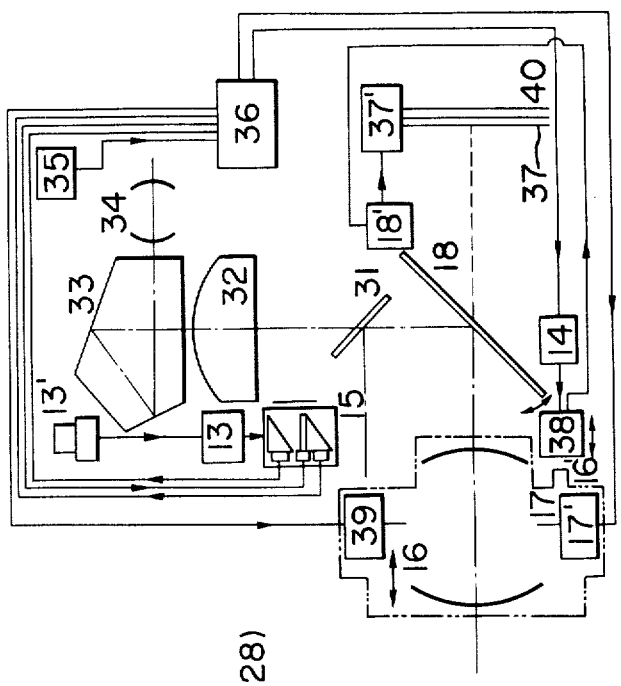
FIG. 4 is a block diagram of a device according to the invention applied to a single lens reflex camera.

FIG. 4 is a block diagram showing an embodiment in which the present device is applied to a single lens reflex camera. In FIG. 4, a half mirror is indicated bby reference character 18' having a mirror lap mechanism 31 disposed in the finder optical path, and photometric operation and focal detection are effected by light fluxes divided thereby. The reference character 32 denotes a condenser lens, 33 a penta prism, 34 an eyepiece, 35 a dial for setting shutter speed and film sensitivity, 36 a so-called control circuit having circuits in FIG. 1 arranged, 37 a shutter curtain of a focal plane shutter, 37' a shutter mechanism, 38 a focussing stop mechanism of the photographing lens 16 which effects movement corresponding to that of the relay lens system 16' shown in FIG. 1, and 39 a holding mechanism for the photographing lens 16. Other reference characters similar to those in FIG. 1 refer to parts similar to the corresponding parts in FIG. 1. The photographing lens 16 has a projection 16', the position of which is controlled by the focussing mechanism 38. The arrows in the drawing indicate directions of transmitting signals.

The operation of the system of FIG. 4 will now be described.

The light fluxes from the object that pass through the photographing lens 16 are reflected at 90° by the totally reflecting mirror 18 and are viewed after passing through the condenser lens 32, penta prism 33, and eyepiece 34.

By charging the camera, the film is advanced and the shutter charged and at the same time the photographing lens 16 is charged into a "near" position by means of a charge mechanism not shown, this condition being held by the holding mechanism 39. Next, the release motor 13 will drive in response to depression of the shutter button 13', and the detecting section 15 then begins to scan. The photometric operation and optical position measuring operation are performed in a successive order, the operation thereof being exactly the same as previously described. This optical position measuring operation causes the pulse motor 14 to be driven by a positive pulse through the control circuit 11, the position of the focussing stop mechanism 38 being accordingly controlled. At the position thus conmtrolled the object image is formed in the film surface when the holding mechanism 39 is released from its holding.

When the position of the focussing stop mechanism 38 is controlled, the aperture mechanism 17' is actuated through the control circuit 36, according to the illuminance signal of the object memorized in the control circuit 36 by the photometry, the shutter speed and film sensitivity, the latter two preset by the shutter speed and film sensitivity setting dial 35, to control the aperture 17 of the photographing lens 16 for imparting a proper exposure to the film. At the same time, the photographing lens 16 is released from the hold of the holding mechanism 39 and is moved from the "near" position toward the "infinity" position by means of a spring not shown and the projection 16' of the lens runs into the focussing stop mechanism, position of which has been controlled in advance, and stops. At the position of the photographing lens controlled by the focussing stop mechanism 38, the object light flux is able to form an image on the film surface. When the projection 16' of the photographing lens 16 runs against the focussing stop mechanism 38, the mirror mechanism 18' is driven by a signal therefrom, the totally reflecting mirror 18 moves upward and the shutter mechanism 37' operates to propel the shutter curtain 37 according to time of shutter preset, exposing the film surface 40 to the object light flux for the proper period.

If a mechanism is provided to establish a proper aperture when the aperture is controlled by the aperture control mechanism 17', even during movement by action of a spring not shown after the photographing lens 16 has been released from its held position, is provided, the period required for one operation of the camera may be reduced, alternatively, or the photographing lens 16 may be moved after the aperture has been controlled. The focussing stop mechanism 38 may be reset by a negative pulse produced by a signal after completion of an exposure as previously described or may also be reset by a mechanism for reset by a camera charge, if such is provided.

Figure 5:
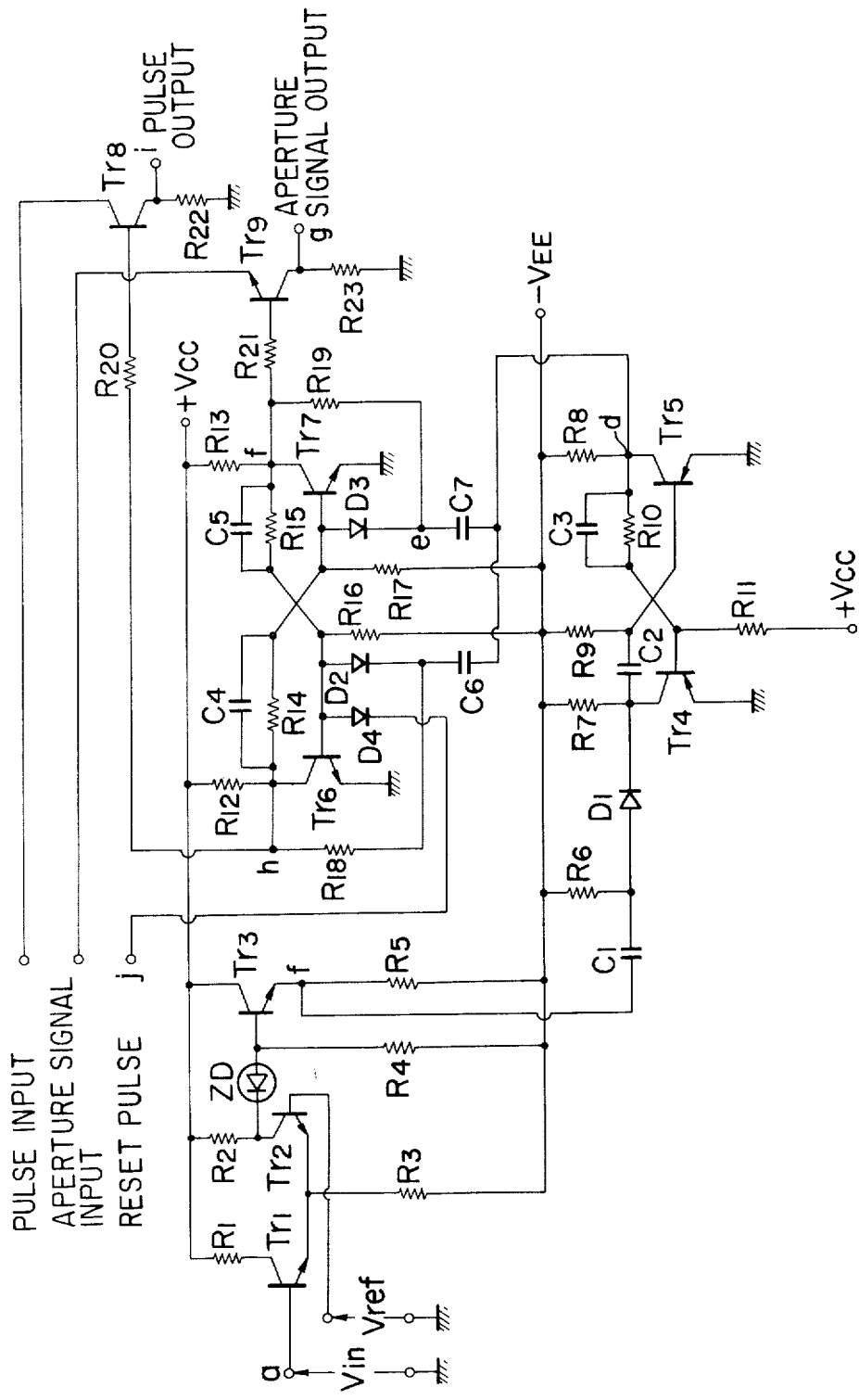
FIG. 5 is a diagram of a preferred form of electric circuit comprising a comparing circuit 7 and holding circuits 3 and 10.

FIG. 5 shows a preferred form of an electric connection diagram comprising said comparing circuit 7 and holding circuits 3 and 10. In FIG. 5, the reference character $V_{in}$ denotes an output voltage obtained from the optical system position detecting circuit 6, $V_{ref}$ a reference voltage preset in the comparing circuit 7, $R_1 - R_{23}$ resistances, $T_{r1} - T_{r9}$ transistors, $C_1 - C_7$ condensers, $Z_D$ a Zener diode, and $D_1 - D_4$ diodes. FIG. 6 is a time chart showing operations in parts shown in FIG. 5. Wave forms $(a)$, $(b)$, $(c)$, $(d)$, $(e)$, $(f)$, $(g)$, $(h)$ and $(i)$ are wave-form diagrams for output signals from contacts $a$, $b$, $c$, $d$, $e$, $f$, $g$, $h$, and $i$ in FIG. 5.

The mode of operation will now be described with reference to the circuit shown in FIG. 5. In case the voltage $V_{in}$ supplied from the optical system position detecting circuit 6 is lower than the reference voltage $V_{ref}$ in the comparing circuit 7, a flip-flop circuit is reset and therefore the collector potential of transistor $T_{r6}$ in the flip-flop circuit is made high, so that the transistor $T_{r8}$ is maintained in ON condition to pass a pulse into a pulse motor 14. In this state, a collector potential of transistor $T_{r7}$ is conversely low, so that transistor $T_{r9}$ is in OFF condition to block the transmission of an aperture signal to the aperture control circuit 4.

Considering now the case in which the voltage $V_{in}$ suplied from the optical system position detecting circuit 6 is higher than the reference voltage $V_{ref}$ in the comparing circuit 7, the comparing circuit 7 operates to elevate the emitter potential of transistor $T_{r3}$, and a monostable flipflop is actuated by a positive differential pulse to produce a negative pulse at the collector of transistor $T_{r5}$. Accordingly, transistor $T_{r7}$ of next flip-flop is triggerred and the collector potential becomes high to turn transistor $T_{r9}$ ON, then an aperture signal passes and at the same time the collector potential of transistor $T_{r6}$ of the flip-flop becomes low to turn transistor $T_{r8}$ OFF, thus blocking the transmission of an input pulse to the pulse motor 14.

Further, transistors $T_{r8}$ and $T_{r9}$ are maintained respectively in OFF and ON conditions until the flip-flop is reset by a reset pulse.

In accordance with this invention, as previously described, a pulse motor is employed to serve as a driving source for optical system position controlling means, thereby avoiding the provision of a servo mechanism for the control system, thus maintaining stabilization without suffering from troublesome phenomena such as unstable action peculiar to servo systems. Further photoelectric converting elements having a high detecting sensitivity are employed to enable photographing of objects of low brightness with accurate optical system position control by a simple operation, that is, by merely depressing the shutter release, without requiring provision of a particularly complicated mechanism. Further, in the device of the invention, in order to make it possible to detect the focal plane of an object of low brightness, assuming that a photoelectric output of a focal surface indicates an extreme value in the image formation space of the optical system, a bias intensity is imparted to focus detecting elements to thereby elevate the detecting sensitivity. As a result, focus detecting may be realized for objects having a wide range of brightness.

The control of the intensity of the light emitting diodes 29 shown in FIG. 2 is accomplished by the bias intensity control circuit 5 of FIG. 1. The word "bias" in this sense merely means that the level of light intensity is shifted by the provision of these lamps interposed between the photosensitive elements 27 and 28. The purpose of the bias intensity control circuit is, as has already been explained, to compensate for the variation in lighting of an object to be photographed and the term "bias" must be understood herein in this context.

We claim:

1. An optical system having a controlling device therefor and comprising:

an image forming fixed optical system for forming an image of the object to be photographed;

a light splitting means for splitting a light beam passed through said image forming fixed optical system from the object to be photographed into a first and second light beam;

an image forming movable optical means disposed behind said light splitting means and having an optical axis in alignment with the optical axis of said first light beam, said image forming movable optical means being movable along its optical axis for varying its focusing position;

a position controlling means for controlling the position of said image forming movable optical means, said position controlling means including a position detecting means for detecting the position of the image of the object formed by said image forming fixed optical system, said detecting means being movable in said second light beam to detect the position of the image of said object in accordance with the brightness of light gathered from the object, an image forming movable optical system shifting means for controlling the movement of said image forming movable optical means, said image forming movable optical system shifting means being controlled by an output signal from said position detecting means, whereby said image forming movable optical means is moved along its optical axis, so that the object light beam passed therethrough and through said image forming fixed optical system forms the object image at a predetermined position.

2. An optical system according to claim 1, wherein said position detecting means has a light receiving surface inclined with respect to the optical axis of said second light beam and moves across said second light beam in a direction approximately perpendicular to the optical axis of the second light beam.

3. An optical system according to claim 2, wherein said light receiving surface of said position detecting means is provided with a photosensitive element.

4. An optical system according to claim 3, wherein said light receiving portion of said position detecting means is provided with a plurality of photosensitive elements.

5. An optical system according to claim 2, wherein said image forming movable optical system shifting means includes a pulse motor.

6. An optical system according to claim 1, wherein said position detecting means includes a signal generating means for detecting the brightness of light from the object and producing an output signal in correspondence with said brightness of object light, and a signal comparing means for comparing the output signal of said signal generating means with a reference signal, said signal comparing means being electrically connected to said image forming movable optical system shifting means to control said movable image forming optical system shifting means in correspondence with a difference between said reference signal and said output signal of said signal generating means.

7. An optical system according to claim 6, wherein said image forming movable optical system shifting means is electrically connected to said signal comparing means and is provided with a motor mechanically linked to said image forming movable optical means.

8. An optical system according to claim 7, wherein said motor is a pulse motor.

9. An optical system according to claim 1, whereidn said photomeasuring means is provided with an alarm means for alarm indication in case the object light quantity is below a predetermined value.

10. An optical system having a position controlling device therefor and comprising:

a image forming fixed optical system for forming an image of the object to be photographed;

a light splitting means for splitting the light beam passed through said image forming fixed optical system from the object to be photographed into a first and second light beam;

a light regulating means provided between said image forming fixed optical system and said light splitting means and for controlling the light quantity provided to said light splitting means;

a photomeasuring means for measuring the light quantity passed through said image forming fixed optical system and controlling said light regulating means in accordance with said light quantity, said photomeasuring means being selectively located in said second light beam;

an image forming movable optical means disposed behind said light splitting means and having an optical axis in alignment with the optical axis of said first light beam, said image forming movable optical means being movable along the optical axis of said first light beam for varying the focusing position, and a position controlling means for controlling the position of said image forming movable optical system, said position controlling means including:

a position detecting means for detecting the position of the image of the object formed by said image forming fixed optical system, said position detecting means being movable in said second light beam to detect the position of said image in accordance with the brightness, and an image forming movable optical system shifting means for controlling the movement of said image forming movable optical means, said shifting means being controlled in accordance with an output signal of said position detecting means, whereby said image forming movable optical means is movable along its optical axis so that the light beam passed therethrough and through said image forming fixed optical system is focused at a predetermined position with constant light quantity.

11. An optical system according to claim 10, wherein said position detecting means is provided with a light receiving surface inclined with respect to the optical axis of said second light beam and is movable across in said second light beam.

12. An optical system according to claim 11, wherein said light receiving surface of said position detecting means is provided with a light sensitive element.

13. An optical system according to claim 12, wherein said photomeasuring means has a biasing light emitting means for emitting a bias light to said light receiving surface of said position detecting means in a case where the light quantity from the object is below a predetermined value.

14. An optical system according to claim 11, wherein said position detecting means and said photomeasuring means cooperatively and successively move across said second light beam in a direction of movement approximately perpendicular to the optical axis of said second light beam.

15. An optical system according to claim 14, wherein said photomeasuring means is provided with a memory means for memorizing temporarily an object light quantity information.

16. An optical system having a position controlling device therefor and comprising:
   an image forming fixed optical system for forming an image of an object to be photographed;
   a light splitting means for splitting the light beam passed through the image forming fixed optical system from the object to be photographed into a first and a second beam;
   a trigger means for activating said optical system position controlling device, the trigger means selectively taking a first and a second position;
   a light regulating means for controlling the light quantity passing through said image forming fixed optical system, said light regulating means being arranged between said image forming fixed optical system and said light splitting means;
   a photomeasuring means for measuring the light quantity passed through said image forming fixed optical system and controlling said light regulating means in correspondence with said light quantity, said photomeasuring means being selectively arranged in said first light beam;
   a memory means for memorizing temporarily an object light quantity information measured by said photomeasuring means;
   an image forming movable optical means being arranged behind said light splitting means and having an optical axis in alignment with the optical axis of said second optical beam, said image forming movable optical means being movable along its optical axis so as to vary the focusing position;
   an image forming movable optical system shifting means for controlling the movement of said image forming movable optical means, said image forming movable optical system shifting means being mechanically linked with said image forming movable optical means;
   a controlling means for controlling said image forming movable optical system shifting means, said control means comprising
      a driving means driven selectively by said trigger means, said driving means effecting a driving action when said trigger means is in said first position and effecting no driving action when said trigger means is in said second position;
      a position detecting means for detecting the position of the object image formed by said fixed optical system, said detecting means being mechanically linked with said driving means to be movable in said first light beam by said driving means and being provided with a signal producing means for producing a signal corresponding to the brightness of said object image;
      a comparing means for comparing a signal from said signal producing means with a reference signal, said comparing means generating a signal which releases the memorizing operation of said memory means,
   whereby said image forming movable optical means is moved along its optical axis so that the object rays passed through said image forming fixed optical system forms the object image at a constant light quantity in a predetermined position.

17. An optical system having a position controlling device therefor and comprising:
   a image forming fixed optical system for forming an image of the object to be photographed;
   a light splitting means for splitting the light beam passed through said image forming fixed optical system from the object to be photographed into a first and a second optical beam;
   a trigger member for activating the position controlling device of said optical system, the trigger member being arranged for displacement between a first and a second position;
   a light regulating means arranged between said image forming fixed optical system and said splitting means and for controlling the light quantity provided to said light light splitting means;
   a photomeasuring means being provided for selective movement into said first light beam from a starting position for measuring the object light quantity passed through said image forming fixed optical system and controlling said light regulating means in correspondence with said object light quantity;
   a memory means for memorizing temporarily an object light quantity information obtained by the photometry of said photomeasuring means;
   an image forming movable optical means arranged behind said light splitting means and having an optical axis which is in alignment with the optical axis of said second light beam, said image forming movable optical means being movable along its optical axis from a starting position to vary the focusing position;
   an image forming movable optical system shifting means for controlling the movement of said image forming movable optical means, said image forming movable optical means being mechanically linked with said image forming fixed optical means;
   a controlling means for controlling said image forming movable optical system shifting means, said controlling means including
      a driving means being selectively driven by said trigger member, in such a manner that said driving means effects a driving action when said trigger member is in said first position and effects no driving action when said trigger member is in said second position,
      a position detecting means for detecting the position of the object image formed by said image forming fixed optical system, said detecting means being mechanically linked with said driving means to thereby move from a starting position into said first light beam in a direction approximately perpendicular to the optical axis of said first light beam, and said position detecting means having a light receiving surface inclined with respect to the optical axis of the first light beam and having a signal generating means for generating a signal in correspondence with the brightness of the object image, and a comparing means for comparing the signal generated by said signal generating means with a reference signal, said comparing means generating a signal which releases the memorizing operation of the memory means and also a signal controlling said controlling means when the compared signals reach a predetermined magnitude relation;

a biasing light emitting means for emitting a biasing light to said signal generating means when the object light quantity measured by said photomeasuring means is below a predetermined value;

a reset means for resetting said photomeasuring means, said movable optical means and said position detecting meeans to their respective starting positions, said reset means being arranged for actuation in cooperation with said trigger member when said trigger member is moved from said second to said first position.

18. An optical system according to claim 17, wherein said photomeasuring means is provided with an alarm means for alarm indication when the object light quantity is below a predetermined value.

19. An optical system according to claim 17, wherein said photomeasuring means and said position detecting means are integrally formed so as to be movable together.

20. An optical system having a position controlling device therefor and comprising:

an image forming optical system for forming an image of the object to be photographed, said optical system being movable selectively along its optical axis;

a light splitting means for splitting the light beam passed through said optical system from the object to be photographed into a first and a second light beam, said first light beam passing through a desired image forming plane on which said image forming optical system is allowed to form the object image;

a position controlling means for controlling said selective movement of said image forming optical system, said position controlling means including a position detecting means for detecting the position of the object image formed by said image forming optical system, said position detecting means being selectively movable into said second beam split off by said splitting means to detect the image position in accordance with the brightness of an object image in said second light beam, an indicating means controlled in correspondence with an output signal of said position detecting means to determine the desired position of said image forming optical system, and a driving means for displacing said image forming optical system to said position determined by said indicating means, said driving means being selectively controlled in response to the output signal of the position detecting means, whereby said image forming optical means is moved along its optical axis so that the light rays passed through said optical system form the object image on said image forming plane.

21. An optical system according to claim 20, wherein said position detecting means has a light receiving surface inclined with respect to the axis of said second light beam and movable across said second light beam in approximately perpendicular direction to the optical axis of said second light beam.

22. An optical system according to claim 21, wherein said light receiving surface is provided with a plurality of the photosensitive elements.

23. An optical system according to claim 20, wherein said position detecting means includes a signal generating means which detects the brightness of the object and generates an output signal in correspondence with said object brightness, and a signal comparing means for comparing the signal from said signal generating means with a reference signal, said signal comparing means being electrically connected to said driving means to control said driving means in response to a difference between the signal from said signal generating means and the reference signal.

24. An optical system according to claim 23, wherein said driving means is electrically connected to said signal comparing means and has a motor mechanically linked with said driving means.

25. An optical system having a position controlling device therefor and comprising:

an image forming optical system for forming an image of the object to be photographed, aid image forming optical system being movable selectively along its optical axis;

a light splitting means for splitting the light beam passed through said optical system from the object to be photographed into a first and a second light beam;

a light regulating means disposed between said image forming optical system and said light splitting means, said regulating means controlling the light quantity provided to said light splitting means;

a photomeasuring means for measuring the object light quantity passed through said image forming optical system and controlling said light regulating means in correspondence with said object light quantity, said photomeasuring means being selectively movable in said second light beam, and a position controlling means for controlling the selectively moved position of said image forming optical system, said position controlling means including a position detecting means for detecting the position of the focused image formed by said image forming optical system, said position detecting means being selectively movable in said second light beam and detecting the focused position according to the brightness of the object image, an indicating means for the displaceable position of said image forming optical system, said indicating means being controlled in accordance with an output signal of said position detecting means to determine the proper position of said image forming optical system, and a driving means for displacing said image forming optical system to the position determined by said indicating means, said driving means being selectively controlled in accordance with the output signal of said position detecting means;

whereby said image forming optical system is moved along its optical axis so that light rays passed through said image forming optical system form the image at constant light quantity at a predetermined position in said first light beam.

26. An optical system according to claim 25, wherein said position detecting means has a light receiving surface inclined with respect to the optical axis of said first light beam and is movable across said first light beam in approximately perpendicular direction to the optical axis of said light beam.

27. An optical system according to claim 26, wherein said light receiving surface is provided with a photosensitive element.

28. An optical system according to claim 27, wherein said photomeasuring means has a biasing light emitting means for emitting biasing light to said light receiving surface when the object light quantity is below a predetermined value.

29. An optical system according to claim 25, wherein said photomeasuring means has a memory means for memorizing temporarily an object light quantity information.

30. An optical system according to claim 25, wherein said photomeasuring means has an alarm means for alarm-indicating when said object light quantity is below a predetermined value.

31. In combination a single lens reflex camera and an optical system having a position controlling device and comprising:

a phototaking optical system for forming an image of the object to be photographed, said phototaking optical system being selectively movable along its optical axis;

a trigger member for effecting the operation of said camera, said trigger member being displaceable selectively between a first and a second position;

an optical means being selectiveldy arranged for positioning on and off the optical axis of said phototaking optical system, said optical means reflecting the light beam passed through said phototaking optical system into a first and a second light beam, said first light beam being formed when said optical means is off the optical axis of said phototaking optical system, and said second optical beam being formed when said optical means is on said optical axis;

a light sensitive plane disposed on the optical axis of said first light beam;

a light regulating means disposed between said phototaking optical system and said optical means, said regulating means controlling the light quantity provided to said optical means and to said light sensitive plane;

a photomeasuring means for measuring the object light quantity passed through said phototaking optical system and controlling said regulating means in correspondence with the object light quantity, said photomeasuring means being selectively arranged in said second light beam;

a memory means for memorizing temporarily an object light quantity information obtained by said photomeasuring means;

a position controlling means for controlling the selectively moved position of said phototaking optical system, said position controlling means including a position detecting means for detecting the position of the object image formed by said phototaking optical system, said position detecting means being provided with a signal generating means which selectively moves in said second light beam along the optical axis thereof, a first driving means for moving selectively said position detecting means in said second light beam, said first driving means being actuated in association with the displacing operation of said trigger member, an indicating means for indicating the moved position of said phototaking optical system, said indicating means being controlled in accordance with the output signal of said position detecting means to determine the position into which said phototaking optical system should be moved, and a second driving means for displacing said phototaking optical system to the position determined by said indicating means, said second driving means being selectively controlled in accordance with the output signal from said position detecting means; and a displacement detecting means for detecting whether or not said phototaking optical system is displaced to the determined position, said displacement detecting means being arranged to generate a signal for placing said optical means off the optical axis of said phototaking optical system and a signal for releasing the memory of said memory means;

whereby said phototaking optical system is moved along its optical axis so that light rays passed through said phototaking optical system form the object image on said light sensitive plane at constant light quantity.

32. An optical system having a position controlling device therefor and comprising:

an image forming optical system for forming an image by light from an object to be photographed, said optical system being selectively movable along its optical axis;

a position controlling means for controlling the selectively movable position of said image forming optical system, said position controlling means including a movable position detecting means for detecting the position of the object image formed by said image forming optical system, said position detecting means being movable across a light beam passed through said image forming optical system in an approximately perpendicular direction to the optical axis of said light beam, and having a light receiving surface inclined with respect to the optical axis of said light beam, said light receiving surface being arranged to generate a signal in correspondence with the brightness of said object image, and a driving means for displacing said image forming optical system in response to the output signal of said light receiving surface;

whereby said image forming optical system is displaced along its optical axis to form the object image on a predetermined plane.

33. An optical system according to claim 32, wherein said light receiving surface is provided with a plurality of photosensitive elements.

34. An optical system according to claim 32, wherein said position detecting means includes a signal comparing means for comparing a signal generated by said signal generating means with a reference signal, said signal comparing means being electrically coupled with said driving means to control said driving means in correspondence with a difference between said reference signal and said signal generated by said signal generating means.

* * * * *